United States Patent [19]

Suzuki et al.

[11] 3,992,260

[45] *Nov. 16, 1976

[54] METHOD FOR INCREASING YIELD OF SUCROSE

[75] Inventors: Hideo Suzuki; Harumi Yoshida; Yoshiko Ozawa; Akira Kamibayashi, all of Chiba; Munetaka Sato, Tokyo; Atsushi Mori; Makoto Endo, both of Hokkaido, all of Japan

[73] Assignee: Agency of Industrial Science & Technology, Tokyo, Japan

[ * ] Notice: The portion of the term of this patent subsequent to Oct. 23, 1990, has been disclaimed.

[22] Filed: May 22, 1974

[21] Appl. No.: 472,494

Related U.S. Application Data

[63] Continuation of Ser. No. 210,555, Dec. 21, 1971, abandoned.

[30] Foreign Application Priority Data

Dec. 23, 1970 Japan .............................. 45-117011

[52] U.S. Cl. ...................................... 195/11; 195/7; 195/31 R

[51] Int. Cl.[2] ...................................... C12D 13/02

[58] Field of Search .................... 195/7, 11, 31 R, 4

[56] References Cited

UNITED STATES PATENTS

| | | | |
|---|---|---|---|
| 3,664,927 | 5/1972 | Shimizu et al. | 195/31 R |
| 3,767,526 | 10/1973 | Suzuki et al. | 195/11 |
| 3,846,432 | 9/1974 | Shimizu et al. | 195/11 |

OTHER PUBLICATIONS

Pigman et al., The Carbohydrates, pp. 501–504, Academic Press Inc., 1957.

*Primary Examiner*—A. Louis Monacell
*Assistant Examiner*—Thomas G. Wiseman
*Attorney, Agent, or Firm*—Kurt Kelman

[57] ABSTRACT

In a method for producing sucrose from beets or beet molasses by the deionization process using ion-exchange resins or the saccharate process or in a method for producing sucrose from beets without resorting to either of the two processes mentioned above, α-galactosidase is allowed to act upon the sugar solution, while in process, so as to hydrolyze the raffinose contained therein into sucrose and galactose. The raffinose-hydrolyzed sugar solution is returned to the process following the stage at which the sugar solution is withdrawn. Thereafter, the sugar solution is treated in the fixed sequence to effect the recovery of sucrose contained in the sugar solution.

9 Claims, No Drawings

METHOD FOR INCREASING YIELD OF SUCROSE

This is a continuation, of application Ser. No. 210,555, filed Dec. 21, 1971, now abandoned.

This invention relates to a method for increasing the yield of sucrose in the production of sucrose from beets.

In an ordinary operation for recovering sucrose contained in the sugar solution extracted from beets, the sugar solution is purified, then concentrated and crystallized into massecuite and the massecuite is separated by centrifugal treatment into mother liquor and sucrose crystals. Then, the crystals are recovered. In this case, the recovery ratio of sucrose is generally heightened, through slightly, in proportion as the sucrose purity in the sugar solution is increased. The recovery ratio for each boiling and centrifugal treatment, in most cases, falls in the range of from 45 to 60 percent. It is not possible to recover the whole sucrose contained in the sugar solution through only one boiling and centrifugal treatment.

This explains why beet sugar plants usually repeat sugar-boiling and centrifugal treatments on sugar solution in an effort to recover as much sucrose from the sugar solution as possible. If sugar-boiling and centrifugal treatments are repeated, however, raffinose and impurities are gradually accumulated in the molasses, rendering the boiling and centrifugal treatments difficult. Both sugar-boiling and centrifugal treatments will consequently come to consume increasingly longer time. Thus, the recovery of sucrose is made hardly payable. The molasses which no longer permits economical recovery of sucrose is discharged from the process line as waste molasses.

One possible cause for the limited recovery of sucrose consists in the behaviors of the impurities and raffinose which are contained in the sugar solution. If the amount of ash, soluble nitrogen compounds and other impurities contained in the sugar solution reaches a certain level, these impurities impede normal eduction of sucrose crystals. Raffinose contained in the sugar solution not only obstructs the eduction of sucrose crystals but also causes sucrose crystals to assume the shape of needles. Thus, they tend to impair the economy of sucrose recovery. In the purification process such as the deionization process using ion-exchanges resin or the saccharate process, most impurities can be removed. By contrast, very little raffinose is removed in this process. The increased yield of sucrose due to improvement of sucrose purity by the removal of impurities is therefore comparatively small where the purification process fails to remove raffinose even if it is effective in the removal of impurities.

Substances which impede the recovery of sucrose are chiefly ash, soluble nitrogen compounds and other impurities as well as raffinose. Most of the impurities can be removed in the deionization process using ion-exchange resin or in the saccharate process, whereas raffinose can hardly be removed in such process. Even if the impurities are removed by such treatment, the recovery of sucrose is impeded when the raffinose survives the removal.

For the purpose of increasing the amount of sucrose crystals to be recovered, it is sufficient to decrease the sucrose purity in the final molasses by lowering the sucrose purity in the final massecuite and, at the same time, to lessen the quantity of the final molasses. In the case of the conventional method, an effort made to lower the sucrose purity in the final massecuite results in an increased raffinose content in the massecuite. Consequently, the sugar-boiling treatment consumes a longer time and the centrifugal treatment either consumes a longer time or becomes altogether impracticable. In fact, it has barely been possible to lower the sucrose purity in the final molasses to the level of about 60 percent. (in the production of sucrose from molasses by the barium-saccharate process, for example, the sucrose purity in the final molasses is on the order of 65 to 70 percent). If the conventional method is employed without modification, it is difficult to increase the recovery ratio of sucrose by further lowering the sucrose purity in the final molasses.

The term "massecuite" as used in this specification means the mixture of sucrose crystals and mother liquor which is obtained in the sugar-boiling process and the term "molasses" means the sugar solution which remains after removal of the sucrose crystals from the massecuite.

It is the main object of this invention to provide a method for readily increasing the yield of sucrose by overcoming the various drawbacks which are involved in the production of sucrose from beets by the conventional processes.

The other objects and characteristic features of this invention will become clear from the further description to be given hereinafter.

Processes known to date for producing sucrose from beets or beet molasses include a process which resorts to the ionizatior treatment utilizing ion-exchange resin, saccharate processes (calcium saccharate process, barium saccharate process, etc.), and a process which does not utilize either the deionization treatment or the saccharate treatment (generally called the "non-Steffen process"). In these processes, the sugar solution which has been purified in the purification stage and concentrated in the evaporation stage is converted by the sugar-boiling treatment into massecuite. The massecuite is separated into sucrose and molasses by the centrifugal treatment. The molasses is again subjected to the sugarboiling treatment and the massecuite consequently obtained is again separated into sucrose and molasses by the centrifugal treatment. As the sugar-boiling and centrifugal treatment are repeated, the accumulation of raffinose progresses proportinally and makes the economic recovery of sucrose increasingly more difficult in spite of the fact that the molasses contains sucrose by more than 50 percent.

The present invention aims to recover sucrose additionally from the sugar solution which has undergone the aforementioned treatment of purification and concentration or centrifugation. It accomplishes this recovery by allowing the α-galactosidase to act upon the sugar solution thereby hydrolyzing the raffinose contained therein into sucrose and galactose, returning the resultant hydrolyzate to the stage following the process in which the sugar solution has been withdrawn and subjecting it to the sugar-boiling treatment.

In producing sucrose from beets utilizing the deionization treatment using ion-exchange resins, the hydrolysis of raffinose by the α-galactosidase can be effected on the diffusion juice, the sugar solution which has undergone the carbonation and filtration treatments, the sugar solution which has undergone the sulfitation and filtration treatments (performed optionally), the sugar solution which has been cooled down or which is in the process of cooling for the deionization treatment using ion-exchange resins, and has been lowered to a suitable temperature for hydrolysis of raffinose by the α-galactosidase, the sugar solution which has undergone the deionization treatment using ion-exchange resins (including the sugar solution treated by only cation-exchange resin), the purified sugar solution which has been concentrated, the sugar solution which has been treated with active carbon (performed optionally), the sugar solution which has undergone the decolorization treatment using ion-exchange resin (performed optionally), the molasses obtained at any stage of centrifual treatment of massecuite ranging from the first molasses to the molasses readied for the last boiling treatment, the redissolved sugar solution, and the sugar solution readied for the sugar-boiling treatment. In the production of sucrose from beets utilizing the calcium saccharate process, the hydrolysis of raffinose by the α-galactosidase can be applied to the diffusion juice, the sugar solution which has been carbonated and filtered, the sugar solution which has undergone the sulfitation and filtration treatments (performed optionally), the sugar solution which has been decalcified by means of ion-exchange resin (performed optinally, and may precede the sulfitation treatment), the purified sugar solution which has been concentrated, the sugar solution which has been treated with active carbon (performed optionally), the sugar solution which has undergone the decolorization treatment with ion-exchange resin (performed optionally), the molasses obtained at varying stages of centrifugal treatment of massecuite ranging from the first to the last molasses, the redissolved sugar solution, and the sugar solution readied for sugar-boiling treatment.

In producing sucrose from beets without utilizing either the deionizaion treatment using ion-exchange resins or the saccharate treatment, the hydrolysis of raffinose by the α-galactosidase can be effected on he same sugar solutions as those in the production of sucrose from beets involving the calcium saccharate process, i.e., on the diffusion juice, the sugar solution which has been carbonated and filtered, the sugar solution which has undergone the sulfitation and filtration treatment (performed optionally), the sugar solution which has been decalcified by means of ion-exchange resin (performed optionally, and may precide the sulfitation treatment), the purified sugar solution which has been concentrated, the sugar solution which has been treated with active carbon (performed optionally), the sugar solution which has been decolorized by means of ion-exchange resin (performed optinally), the molasses obtained at varying stages of centrifugal treatment of massecuite ranging from the first molasses to the molasses readied for the last boiling treatment, the redissolved sugar solution, and the sugar solution readied for the sugar-boiling treatment.

In the production of sucrose from beet molasses by the barium-saccharate process, the hydrolysis of raffinose by the -60 -galactosidase can be accomplished in the best molasses as the starting material, the sugar solution which has been carbonated and filtered, the sugar solution which has been treated with sodium sulfate and filtered, the sugar solution which had been treated with bone charcoal (or the sugar solution decolorized with ion-exchange resin or treated with active carbon), the purified sugar solution which has been concentrated, the molasses obtained at varying stages of centrifugal treatment of massecuite ranging from the first molasses to the molasses readied for the last boiling treatment, the redissolved sugar solution, and the sugar solution readied for the sugar-boiling treatment.

The method for the production of beet sugar involving the deionization treatment using ion-exchange resins, as described herein, includes methods such as Imacti method, modified Imacti method and Nitten-Organo method which carry out the deionization treatment using ion-exchange resins prior to the sugar-boiling treatment and method such as the BMA method which carry out the said deionization treatment posterior to the sugar-boiling treatment. The deionization processes using ion-exchange resins suggested to data include a process which uses a strongly acidic cation-exchange resin of H type in combination with a moderately basic anion-exchange resin of OH type or a weakly basic anion-exchange resin of OH type and a process which uses a weakly basic cation-exchange resin of H type in combination with a strongly basic anion-exchange resin of OH type or a moderately basic anion-exchange resin of OH type or a weakly basic anion-exchange resin of OH type. The present invention can be applied to all the methods for producing beet sugar by utilizing all these deionization processes.

The molasses upon which the α-galactosidase is to act is first diluted with water to a suitable concentration (20° to 60° Brix). Then, the α-galactosidase is added to the diluted molasses. The beet juice (the sugar solution which is in a stage ranging from purification process to the process prior to sugar-boiling treatment) generally has a concentration in the range of from 10° to 60° Brix. Therefore, the α-galactosidase may be added directly to the beet juice without any necessity for diluting or concentrating the juice. If the beet juice is concentrated, it is suitably diluted, as required, prior to the addition of the α-galactosidase.

The α-galactosidase to be added to the aforesaid molasses or beet juice may be produced by any method available. It is preferred to manifest little activity of invertase. If the α-galactosidase is of a type having high invertase activity, it should have its invertase activity inactivated suitably prior to use.

Examples of the α-galactosidase suitable for the present invention are α-galactosidases extracted from such plant seeds as coffee bean, Vicia sativa, and Vicia faba and α-galactosidases produced from such microorganisms as brewer's yeast, Aspergillus oryzae, Aspergillus niger, Penicillium paxilli, Calvatia cyathiformls, Mortierella vinacea var. raffinoseutilizer, Streptomyces olivaceus var. raffinoseutilizer, Streptomyces fradiae, Streptomyces roseopinus, E. coli, Aerobacter aerogenes, Streptococcus bovis, Bacillus Delbrückii, Bacillus circulans, and Pseudomonas eisenbergii. Of these enzymes, most suitable is one obtained by culturing Mortierella vinacea var. raffinose utilizer (ATCC 20034).

The hydrolysis ratio of raffinose by α-galactosidase is variable with the concentration of sugar solution, the nature of sugar solution, the activity of the enzyme to be used, and such factors as duration, pH and temperature selected for the action of the enzyme. Generally, this hydrolysis ratio of raffinose increase in inverse proportion to the concentration of sugar solution and in direct proportion to the activity of the enzyme and the duration and temperature selected for the enzymatic action. At temperatures exceeding the level of 65° C, the enzyme is frequently inactivated and cannot withstand a continued use for a long time. When the concentration of sugar solution exceeds 65° Brix, the hydrolysis ratio is lowered to the extent of making the operation unprofitable. In the case of molasses, for example, conditions which are suitable for practicing the hydrolysis vary with the concentration of molasses, the activity of enzyme to be used and so on. To be more specific, 50 to 90 percent of the raffinose contained in the molasses can be hydrolyzed when α-galactosidase is allowed to act for a period of two to three hours on the molasses in relative amounts such as to give a ratio of 2,500,000 to 5,500,000 units of the enzyme to one gram of the raffinose, with the temperature fixed in the range of from 45° to 55° C, the concentration in the range of from 15° to 60° Brix, and the pH value in the range of from 4.8 to 5.2. (The unity of the activity of α-galactosidase is defined to be such that will produce 1 μg of free glucose after the enzyme has been left to act for two hours melibiose having a final concentration of 0.015 mole at 40° and pH 5.2.)

In the case of juice, the amount of the enzyme to be used varies with the kind and amount of impurities contained in the juice. To obtain a hydrolysis ratio of 70 to 90 percent with the diffusion juice, for example, it is necessary to allow the enzyme to act for a period of about 15 minutes on the juice in relative amounts such as to give a ratio of 150,000,000 to 200,000,000 units of the enzyme to one gram of the raffinose, with the concentration fixed in the range of from 13° to 15° Brix and the pH value fixed at 500. This hydrolysis is not advantageous in terms of the amount of enzyme to be used. Considering that the juice does not require dilution which is necessitated in the case of molasses, however, the hydrolysis may at times prove to be advantageous in terms of heat economy. When the raffinose is hydrolyzed, there are formed 342 g of sucrose and 180g of galactose per 504g of raffinose.

The hydrolysis of raffinose can be performed on any of the various sugar solutions mentioned previously.

Although any of the various sugar solutions mentioned previously can be subjected to the hydrolysis of raffinose, it is important that the most suitable sugar solution should be selected by taking into account various factors such as nature and concentration of sugar solution, degree of raffinose accumulation, ease with which the raffinose can be hydrolyzed with the α-galactosidase, and operational balance and heat economy of the various stages of process employed in a factory at which this invention is practiced.

In a factory utilizing the deionization treatment using ion-exchange resins prior to the sugar-boiling treatment, for example, the sugar solution which has not yet been subjected to the deionization treatment may be cooled to 50° C and adjusted to pH 5.0 and 5.2 and, thereafter, subjected to the raffinose-hydrolyzing treatment. Otherwise, the molasses may be diluted with water to 30° to 50° Brix and adjusted to pH 5.0 to 5.2 and then subjected to the raffinose-hydrolyzing treatment.

The status of affairs differs from one factory to another. It is, therefore, necessary that the raffinose-hydrolyzing process should be set up at such point in the whole plant operation that is most advantageous for the elimination of all drawbacks experienced in the sugar-boiling and centrifugal treatments owing to the existence of raffinose.

This raffinose-hydrolyzing process may be set up at two or more stages. For example, it may be set up at one stage preceded by the concentration treatment and at another stage preceded by the fourth sugar-boiling treatment. In this case, the raffinose contained in the juice concentrated in the preceding concentration treatment can be hydrolyzed and the resultant hydrolyzate can be subjected to the sugar-boiling treatment that follows, while the sugar solution centrifugally separated in the fourth sugar-boiling treatment can be subjected to the raffinose-hydrolyzing treatment and then returned to the fifth sugar-boiling treatment.

The sugar solution which has had most of its raffinose content hydrolyzed is returned to the stage following the stage from which that sugar solution has previously been withdrawn. Thereafter, the returned sugar solution is allowed to go through the subsequent stages of treatment in the fixed sequence to effect recovery of the sucrose contained therein. Thus, the raffinose-hydrolyzing treatment by the method of this invention can be applied to the sugar solution which is obtained at the varying stages of treatment.

As the sugar solution which has had most of its raffinose content hydrolyzed is forwarded through the subsequent stages of treatment in the normal sequence, sucrose is recovered therefrom in the sugar-boiling and centrifugal treatments. Impurities and unhydrolyzed raffinose are accumulated progressively as the number of sugar-boiling treatments increases. The amount of raffinose thus accumulated, however, is smaller than when the raffinose-hydrolyzing treatment is not included. The accumulation decreases in direct proportion as the amount of raffinose hydrolyzed increases. Consequently, the centrifugal treatment of massecuite becomes easier to perform and consumes less time even if the sucrose purity of the final massecuite is lowered further than when the raffinose-hydrolyzing treatment is not included.

According to the present invention, the α-galactosidase is allowed to act upon the sugar solution, no matter what method of purification the sugar solution has undergone, so as to hydrolyze the raffinose contained therein and decrease the raffinose content in the sugar solution at the subsequent stages of treatment. This can bring about the effect of improving the efficiency of the sugar-boiling treatment and that of the centrifugal treatment of the final massecuite thereby enabling the sugar purity of the final massecuite to be lowered below the level attained by the conventional method, lowering the sugar concentration in the final molasses and decreasing the amount of the final molasses and eventually increasing the amount of sucrose to be recovered.

Take, for instance, the barium saccharate process which is employed for recovering sucrose from the molasses obtained in the beet sugar factory. If the sucrose is recovered in the form of barium saccharate from the molasses which contains raffinose and impurities in so high concentrations that the sucrose cannot be recovered profitably by other methods, about 60 percent of the raffinose contained therein is removed. Consequently, the influence of raffinose is decreased and the economy of the recovery of sucrose is improved in direct proportion to the amount of raffinose removed. In the sugar solution recovered by this method, the sucrose purity reaches about 95 percent or more. The sucrose purity of the sugar solution is further heightened by the subsequent purification treatments (such as treatment with bone charcoal, deionizatin treatment with ion-exchange resin, and treatment with active carbon). In recovering sucrose in the sugar-boiling treatment from the sugar solution having such high sucrose purity, however, raffinose is accumulated progressively and the operation of sugar-boiling treatment itself becomes increasingly more difficult as the number of sugar-boiling treatments is increased. As an inevitable consequence, the molasses having a high sucrose purity has to be discharged as the waste molasses. Therefore, the amount of recovered sucrose is comparatively small for the high sucrose purity of the sugar solution after the purification treatment (sugar solution prior to the sugar-boiling treatment).

The accumulation of raffinose can be decreased by using the method of the present invention.

The method of this invention decreases the accumulation of raffinose and, therefore, lowers the sucrose purity of the waste molasses. Consequently, the yield of sucrose is increased.

Preferred embodiments of this invention in the production of sucrose by various methods are cited hereinafter for concrete illustration of the advantages derived from this invention. The invention is, in no way, limited by these examples.

EXAMPLE 1

As the source of a α-galactosidase, there were used pellet-shaped cells containing α-galactosidase (hereinafter referred to as "enzyme-containing cells") and showing very little invertase activity, obtained by inoculating a culture medium containing 1% of lactose, 1% of glucose, 1% of corn steep liquor, 1.0% of ammonium sulfate, 0.1% of urea, 0.2% of sodium chloride, 0.3% of potassium primary phosphate, 0.2% of magnesium sulfate and 1% of calcium carbonate with Mortierella vinacea var. raffinose-utilizer and aerobically culturing the microbe therein at 30° C for 3 days.

The molasses selected for the hydrolysis was the fourth molasses obtained in a beet sugar production plant involving five sugar-boiling treatments and utilizing the deionization process using ion-exchange resins. Table 1 given below shows a composition of this molasses.

Table 1

| | |
|---|---|
| Brix concentration | 76.0° Brix |
| Sucrose concentration | 53.5% |
| Raffinose concentration | 7.05% (9.28% on Brix) |
| Sucrose purity | 70.4% |

The molasses of the aforesaid composition was diluted with water to 30° Brix and adjusted to pH 5.0. To this molasses, the enzyme-containing cells were added in an amount such as to give 4,500,000 units of α-galactosidase potency per gram of raffinose. The mixture was agitated at 50° C for 2.5 hours to allow the enzyme to act upon the raffinose in the molasses. At the end of the agitation, the hydrolysis ratio of raffinose was found to have reached 69.5 percent. When the mixture was filtered to remove the enzyme-containing cells therefrom, the resultant molasses was found to have a composition as shown in Table 2.

Table 2

| | |
|---|---|
| Brix concentration | 30.0° Brix |
| Sucrose concentration | 22.2% |
| Raffinose concentration | 0.85% (2.83% on Brix) |
| Sucrose purity | 74.0% |

Sugar solutions of the compositins shown in Table 1 and Table 2, each in an amount to 20 kg of raw molasses, were separately subjected to sugar-boiling and centrifugal treatments to obtain sugar and waste molasses of the compositions shown in Table 3.

Table 3

| | Molasses undergone raffinose-hydrolysis | | | Molasses not undergone raffinose-hydrolysis | | |
|---|---|---|---|---|---|---|
| | Brix concentration | Sucrose purity | Yield | Brix concentration | Sucrose purity | Yield |
| Sugar | 95.8° Brix | 94.2% | 8.03kg | 95.9° Brix | 95.3% | 6.15kg |
| Waste molasses | 85.2° Brix | 51.2% | 9.19kg | 79.2° Brix | 54.6% | 11.73kg |

The molasses which had not undergone the raffinose-hydrolyzing treatment gave inferior results in the centrifugal treatment. Thus, the sucrose purity of the sugar had to be heightened by using about 1 liter of hot water.

The data of the preceding table indicate that, according to the procedure of Example 1, 5.62 kg of sucrose was recovered in the run involving no raffinose hydrolysis and 7.24 kg of sucrose was recovered in the run involving raffinose hydrolysis each from 20 kg of molasses. This means that there was 1.62 kg of increase in the yield of sucrose. This increase of sucrose yield is noted to far exceed 0.67 kg of sucrose which was formed in consequence of the hydrolysis of raffinose by α-galactosidase.

EXAMPLE 2

The sugar solution (having the composition shown in Table 4) readied for the ion-exchange resins deionization treatment in a process involving the deionization treatment prior to the sugar-boiling treatment was adjusted to pH 5.0.

Table 4

| | |
|---|---|
| Brix concentration | 13.7° Brix |
| Sucrose concentration | 12.7% |
| Raffinose concentration | 0.13% (0.95% on Brix) |
| Sucrose purity | 92.7% |

To this sugar solution, the same enzyme-containing cells as used in Example 1 were added in an amount such as to give 50,000,000 units of α-galactosidase potency per gram of raffinose. The mixture was agitated at 50° C for 15 minutes to allow the enzyme to act upon the raffinose. The hydrolysis ratio of raffinose reached 61.1 percent. The sugar solution obtained by filtering the resultant raffinose-hydrolyzed sugar solution was found to have a composition shown in Table 5.

Table 5

| | |
|---|---|
| Brix concentration | 13.7° Brix |
| Sucrose concentration | 12.8% |
| Raffinose concentration | 0.05% (0.37% on Brix) |

Table 5-continued

| | |
|---|---|
| Sucrose purity | 93.4% |

The raffinose-hydrolyzed sugar solution was filtered and subsequently passed, by an ordinary method, through a column of Amberlite IR-120B (H type) and then through a column of Amberlite IRA-68 (OH type). The juice thus obtained was found to have a composition shown in Table 6.

Table 6

| | |
|---|---|
| Brix concentration | 12.3° Brix |
| Sucrose concentration | 11.9% |
| Raffinose concentration | 0.04% (0.33% on Brix) |
| Sucrose purity | 96.7% |

When the sugar solution having the composition of Table 4 was subjected directly to the deionization treatment using ion-exchange resins without going through the raffinose-hydrolyzing treatment, the sugar solution obtained consequently was found to have a composition as shown in Table 7.

Table 7

| | |
|---|---|
| Brix concentration | 12.3° Brix |
| Sucrose concentration | 11.8% |
| Raffinose concentration | 0.12% (0.98% on Brix) |
| Sucrose purity | 95.9% |

The sugar solutions of Table 6 and Table 7 were concentrated and then subjected to five sugar-boiling treatments. The sugars and the waste molasses obtained at the end of the fifth sugar-boiling treatment were found to have compositions as shown in Table 8 and Table 9 respectively.

Table 8

| | Fifth molasses | Waste molasses |
|---|---|---|
| Brix concentration | 96.0° Brix | 85.3° Brix |
| Sucrose purity | 95.3% | 51.2% |

Table 9

| | Fifth molasses | Waste molasses |
|---|---|---|
| Brix concentration | 95.9° Brix | 80.1° Brix |
| Sucrose purity | 95.4% | 54.6% |

The amount of sucrose to be recovered from 120 kg of the sugar solution of Table 6 and that from 120 kg of the sugar solution of Table 7 were calculated in accordance with the formula for recovery ratio of sucrose found in page 31 of the "Handbook for Manufacture of Sugar," while using the sucrose purity of sugar solution given in Table 6 and that of waste molasses given in Table 8 in the case of raffinose-hydrolyzing treatment given prior to the ion-exchange resins deionization treatment and using the sucrose purity of sugar solution given in Table 7 and that of waste molasses given in Table 9 in the case of process excluding the raffinose-hydrolyzing treatment. The results of this calculation are given in Table 10.

Table 10

| | Recovery amount of sucrose |
|---|---|
| Raffinose-hydrolyzing treatment given prior to ion-exchange resins deionization treatment | 13.77 kg |
| Process excluding raffinose-hydrolyzing treatment | 13.43 kg |

As is evident from Table 10, the yield of sucrose could be increased by 0.34 kg by performing the raffinose-hydrolyzing treatment prior to the ion-exchange resins deionization treatment. This increase of sucrose yield is noted to far exceed 0.07 kg of sucrose which was formed in consequence of the hydrolysis of raffinose by α-galactosidase.

EXAMPLE 3

The best molasses, 40 kg, having the composition of Table 11 was diluted to 78° C and then agitated.

Table 11

| | |
|---|---|
| Brix concentration | 82.0° Brix |
| Polarization | 53.46% |
| Sucrose concentration | 47.35% |
| Raffinose concentration | 4.10% on Brix |
| Sucrose purity | 57.74% |

Milk of barium hydroxide having a concentration of 30 percent as barium oxide was added to the molasses, while under agitation, in an amount such as to give 60g of barium oxide per 100 g of sucrose in the molasses. The mixture was kept at 80° to induce reaction for one hour. The reaction mixture was filtered and then washed with hot water containing 2 percent of barium oxide. The washed filtrate was mixed with 40 liter of water, carbonated at 80° C, filtered, and washed with cold water. Consequently, there was obtained 80.4 kg of sugar solution having a composition shown in Table 12.

Table 12

| | |
|---|---|
| Brix concentration | 22.8° Brix |
| Sucrose concentration | 21.44% |
| Raffinose concentration | 2.84% on Brix |
| Sucrose purity | 94.04% |

Sodium sulfate was added to the sugar solution of Table 12 to precipitate remaining barium ions in the form of barium sulfate. The precipitate was removed by filtration and the filtrate was washed with water. Consequently, there was obtained 85.4 kg of filtrate which was wound to have a compsosition shown in Table 13.

Table 13

| | |
|---|---|
| Brix concentration | 21.5° Brix |
| Sucrose concentration | 20.16% |
| Raffinose concentration | 2.82% on Brix |
| Sucrose purity | 93.77% |

The sodium sulfate-treated sugar solution shown in Table 13 was divided into two equal parts. One part was adjusted with sulfuric acid to pH 5.2. To this sugar solution, the same enzyme-containing cells as used in Examples 1 and 2 were added in an mount such as to give 4,500,000 units of α-galactosidase potency per gram of raffinose. The mixture was agitated and kept to 50° C for 3 hours to allow the enzyme to act upon the raffinose. The hydrolysis ratio of raffinose was found to have reached 68.1 percent. When this raffinose-hydrolyzed sugar solution was filtered, there was obtained 42.7 kg of filtrate which was found to have a composition shown in Table 14.

Table 14

| | |
|---|---|
| Brix concentration | 21.5° Brix |
| Sucrose concentration | 20.46% |
| Raffinose concentration | 0.90% on Brix |
| Sucrose purity | 95.16% |

When this reacted solution was adjusted with caustic soda to pH 8.0, concentrated, and then subjected to five stages of sugar-boiling treatment, there was recovered 8.06 kg of sucrose. The fifth molasses obtained in a total amount of 1.31 kg was found to have a composition shown in Table 15.

Table 15

| | |
|---|---|
| Brix concentration | 84.5° Brix |
| Sucrose concentration | 50.76% |
| Raffinose concentration | 7.26% on Brix |
| Sucrose purity | 60.07% |

When the other part of the sodium sulfate-treated solution was directly concentrated without being subjected to the raffinose-hydrolyzing treatment using α-galactosidase and then subjected to five stages of sugar-boiling treatment, there was recovered 6.92 kg of sucrose. The fifth molasses obtained in a total amount of 2.69 kg was found to have a composition shown in Table 16.

Table 16

| | |
|---|---|
| Brix concentration | 83.5° Brix |
| Sucrose concentration | 62.45% |
| Raffinose concentration | 10.25% on Brix |
| Sucrose purity | 74.79% |

This means that, in recovering sucrose by the barium saccharate process from 20 kg of waste beet molasses, the yield of sucrose could be increased by 1.14 kg when the raffinose contained in the sodium sulfate-treated sugar solution was hydrolyzed by a α-galactosidase. This increase of sucrose yield is noted to far exceed 0.12 kg of sucrose which was formed in consequence of the hydrolysis of raffinose. The increased yield of sucrose is ascribable to the fact that sucrose was formed in consequence of the hydrolysis of raffinose and the sucrose purity of the sugar solution was heightened accordingly and that the eduction of sucrose crystals was facilitated because the raffinose responsible for impeded eduction of sucrose crystals was greatly reduced.

EXAMPLE 4

The second molasses (having the composition shown in Table 17) obtained before the start of the Steffen process in a beet sugar factory using the calcium saccharate process (Steffen process) was used. The second molasses corresponds to the molasses obtained in the beet sugar production utilizing neither saccharate process nor ion-exchange resins deionization process (generally referred to as "non-Steffen process").

Table 17

| | |
|---|---|
| Brix concentration | 85.2° Brix |
| Sucrose concentration | 61.9% |
| Raffinose concentration | 0.87% (1.02% on Brix) |
| Sucrose purity | 72.65% |

This molasses, 20 kg, was diluted with hot water to 30° Brix and adjustedd with sulfuric acid to pH 5.2. To this molasses, the same enzyme-containing cells as used in Example 1 were added in an amount such as to give 4,500,000 units of α-galactosidase potency per gram of raffinose. The mixture was agitated and kept at 50° C to allow the enzyme to act upon the raffinose. The hydrolysis ratio of raffinose was found to have reached 60.8 percent. The raffinose-hydrolyzed molasses was filtered to remove enzyme-containing cells therefrom Consequently, there was obtained 56.8 kg of molasses which was found to have a composition shown in Table 18.

Table 18

| | |
|---|---|
| Brix concentration | 30° Brix |
| Sucrose concentration | 21.9% |
| Raffinose concentration | 0.12% (0.4% on Brix) |
| Sucrose purity | 73.0% |

When the entire amount of this molasses was concentrated and then subjected to the sugar-boiling and centrifugal treatments, there were obtained 6.49 kg of recovered sucrose and 12.3 kg of waste molasses, The waste molasses was found to have 85.5° Brix and 56.5 percent of sucrose purity.

When 20 kg of the aforesaid second molasses was subjected directly to the sugar-boiling and centrifugal treatments without the raffinose-hydrolyzing treatment, there were obtained 6.26 kg of sucrose and 12.5 kg of waste molasses. This waste molasses was found to have 85.3° Brix and 57.3 percent of sucrose purity.

The preceding results indicate that, according to the procedure of Example 4, 6.49 kg of sucrose was recovered in the process including the raffinose-hydrolyzing treatment and 6.26 kg of sucrose was recovered in the process excluding that treatment, each from the second molasses of the same composition obtained in a non-Steffen factory. This means that the raffinose-hydrolyzing treatment gave 0.23 kg of increase to the yield of sucrose. This increase of sucrose yield is noted to far exceed 0.07 kg of sucrose which was formed consequence of the hydrolysis of raffinose by α-galactosidase.

What is claimed is:

1. In a method for producing sucrose from beets wherein raw beet juice extracted from beets is purified into beet juice, and the obtained beet juice is concentrated and thereafter converted in sugar-boiling treatments of a sugar-boiling and centrifugal separation process into massecuite which is separated by centrifugal treatments of said sugar-boiling and centrifugal separation process into molasses and sucrose crystals, the improvement which consists essentially of:

adding alpha-galactosidase to act upon beet juice having a concentration of 10° to 60° Brix and withdrawn before said sugar-boiling and centrifugal separation process thereby hydrolyzing raffinose contained in said beet juice into sucrose and galactose, and wherein said beet juice to which the alphagalactosidase is added is the beet juice before a deionization treatment included in the purification process, and the hydrolysate hydrolyzed by the addition of alpha-galactosidase is subjected to said deionization treatment after removing the alpha-galactosidase therefrom;

separating alpha-galactosidase from the hydrolysate thus obtained, subjecting said resultant hydrolysate to the process following the process from which the beet juice has been withdrawn, and recovering sucrose contained in said hydrolysate in said sugar-boiling and centrifugal separation process, wherein by the hydrolysis of raffinose the amount of the raffinose contained in the beet juice is decreased and the amount of sucrose is increased with the result that the sucrose purity in the beet juice is increased, and both the increase of sucrose purity and the decrease of the raffinose cause the growth of sucrose crystals to be accelerated and at the same time cause the sucrose crystals to be normalized with the result that the sucrose is effectively separated in said sugar-boiling and centrifugal separation process and the amount thereof is increased.

2. The method of claim 1, wherein the alpha-galactosidase is allowed to act upon the raffinose for 15 minutes, the concentration of beet juice is 13° to 15° Brix, the pH of the beet juice is 5, the ratio of alpha-galactosidase to raffinose being 150,000,000 to 200,000,000 units per gram, and the conversion of hydrolyzed raffinose being in the range of 70 to 90 percent.

3. The method of claim 1, wherein the alpha-galactosidase is allowed to act upon the raffinose for 15 minutes, the concentration of beet juice is 15° Brix, the pH of the beet juice is 5, and the ratio of alpha-galactosidase to raffinose is 50,000,000 units per gram.

4. In a method for producing sucrose from beets wherein raw beet juice extracted from beets is purified into beet juice, and the obtained beet juice is concentrated and thereafter converted in sugar-boiling treatments of a sugar-boiling and centrifugal treatments of said sugar-boiling and centrifugal separation process into molasses and sucrose crystals, the improvement which consists essentially of:

adding alpha-galactosidase to act upon molasses withdrawn at any stage of said centrifugal treatments of said sugar-boiling and centrifugal separation process thereby hydrolyzing raffinose contained in said molasses into sucrose and galactose, wherein said molasses is diluted with water to a concentration of from 15° to 60° Brix prior to adding said alpha-galactosidase, the molasses temperature upon said addition being lower than 65° C;

separating alpha-galactosidase from the hydrolysate thus obtained, subjecting said resultant hydrolysate to the sugar-boiling treatment of the stage following the stage at which the molasses has been withdrawn, and recovering sucrose contained in said hydrolysate in the treatments following said boiling treatment, wherein by the hydrolysis of raffinose the amount of the raffinose contained in the molasses is decreased and the amount of sucrose is increased with the result that the sucrose purity in the molasses is increased, and both the increase of sucrose purity and the decrease of the raffinose cause the growth of sucrose crystals to be accelerated and at the same time cause the sucrose crystals to be normalized with the result that the sucrose is sufficiently separated in said sugar-boiling and centrifugal separation process and the amount thereof is increased.

5. The method of claim 4, wherein the alpha-galactosidase is allowed to act upon the raffinose for 2 to 3 hours at a temperature of 45° C to 55° C, the concentration of the molasses being 15° to 60° Brix, the pH of the molasses being 4.8 to 5.2, the ratio of alpha-galactosidase to raffinose being 2,500,000 to 55,000,000 units per gram, and the conversion of hydrolyzed raffinose being in the range of 50 to 90 percent.

6. The method of claim 4, wherein the alpha-galactosidase is added to the molasses in the fourth stage of the centrifugal treatment of said sugar-boiling and centrifugal separation process, and the hydrolysate hydrolyzed by adding the alpha-galactosidase thereto is supplied to the fifth stage of the sugar-boiling treatment of said sugar-boiling and centrifugal separation process after the alpha-galactosidase is removed.

7. The method of claim 6, wherein said molasses is diluted with water to a concentration of 30° Brix and a pH of 5.0 prior to adding the alpha-galactosidase, and the alpha-galactosidase is allowed to act upon the raffinose for 2.5 hours at a temperature of 50° C, the ratio of alphagalactosidase to raffinose being 4,500,000 units per gram.

8. The method of claim 4, wherein the alpha-galactosidase is added to the molasses in the second stage of the centrifugal treatment of said sugar-boiling and centrifugal separation process, and the hydrolysate hydrolyzed by adding the alpha-galactosidase thereto is supplied to the third stage of the sugar-boiling treatment of said sugar-boiling and centrifugal separation process after the alpha-galactosidase is removed.

9. The method of claim 8, wherein said molasses is diluted with water to a concentration of 30° Brix and a pH of 5.2 prior to adding the alpha-galactosidase, and the alpha-galactosidase is allowed to act upon he raffinose for 2 hours at a temperature of 50° C, the ratio of alphagalactosidase to raffinose being 4,500,000 units per gram.

* * * * *